(12) United States Patent
Schoeny et al.

(10) Patent No.: US 10,827,666 B2
(45) Date of Patent: Nov. 10, 2020

(54) SYSTEM AND METHOD FOR CONTROLLING THE SPEED OF A SEED-PLANTING IMPLEMENT BASED ON FURROW CLOSING ASSEMBLY PERFORMANCE

(71) Applicant: CNH Industrial America LLC, New Holland, PA (US)

(72) Inventors: Christopher Schoeny, Yorkville, IL (US); Trevor Stanhope, Darien, IL (US); Darian E. Landolt, Evanston, IL (US)

(73) Assignee: CNH Industrial America LLC, New Holland, PA (US)

( * ) Notice: Subject to any disclaimer, the term of this patent is extended or adjusted under 35 U.S.C. 154(b) by 192 days.

(21) Appl. No.: 16/155,042

(22) Filed: Oct. 9, 2018

(65) Prior Publication Data

US 2020/0107488 A1 Apr. 9, 2020

(51) Int. Cl.
*A01B 67/00* (2006.01)
*A01C 5/06* (2006.01)
(Continued)

(52) U.S. Cl.
CPC ............... *A01B 67/00* (2013.01); *A01C 5/068* (2013.01); *B60W 10/04* (2013.01); *B60W 10/10* (2013.01);
(Continued)

(58) Field of Classification Search
CPC ......... A01B 67/00; A01C 5/068; A01C 21/00; A01C 7/10; A01C 7/203; A01C 7/205; A01C 5/064; B60W 10/04; B60W 10/10; B60W 10/18; B60W 2555/00; B60W 2300/152; B60W 2300/15; B60W 2300/154; B60W 2300/156; B60W 2300/158; B60W 2420/52; B60W 2710/10; B60W 2710/18; B60W 2720/10; B60W 30/18; B60W 30/18009; B60W 30/18172; B60W 30/20; B60W 30/192
(Continued)

(56) References Cited

U.S. PATENT DOCUMENTS 6,079,340 A * 6/2000 Flamme ............... A01B 79/005
111/178
6,438,506 B1 * 8/2002 Yohpe .................... A01B 63/00
701/56

(Continued)

*Primary Examiner* — Richard A Goldman
(74) *Attorney, Agent, or Firm* — Rebecca L. Henkel; Rickard K. DeMille (57) ABSTRACT

In one aspect, a system for controlling the speed of a seed-planting implement may include a furrow closing assembly configured to close a furrow formed in the soil by the seed-planting implement. Furthermore, the system may include a sensor configured to capture data indicative of an operational parameter of the furrow closing assembly. Additionally, the system may include an implement-based controller supported on the seed-planting implement and being communicatively coupled to the sensor. As such, the implement-based controller may be configured to initiate control of a drive parameter of a work vehicle configured to tow the seed-planting implement based on sensor data received from the sensor in a manner that adjusts the speed of the seed-planting implement.

18 Claims, 5 Drawing Sheets

(51) Int. Cl.
   *B60W 10/04* (2006.01)
   *B60W 10/10* (2012.01)
   *B60W 10/18* (2012.01)
   *A01C 21/00* (2006.01)

(52) U.S. Cl.
   CPC .............. *B60W 10/18* (2013.01); *A01C 21/00* (2013.01); *B60W 2300/152* (2013.01); *B60W 2420/52* (2013.01); *B60W 2555/00* (2020.02); *B60W 2710/10* (2013.01); *B60W 2710/18* (2013.01); *B60W 2720/10* (2013.01)

(58) Field of Classification Search
   USPC .... 701/50, 56; 111/149, 190, 191, 192, 193, 111/194, 195; 172/2
   See application file for complete search history.

(56) References Cited

U.S. PATENT DOCUMENTS

| | | | |
|---|---|---|---|
| 8,843,269 B2 | 9/2014 | Anderson et al. | |
| 8,942,860 B2 | 1/2015 | Morselli | |
| 9,148,989 B2 | 10/2015 | Van Buskirk et al. | |
| 9,664,249 B2 | 5/2017 | Kowalchuk | |
| 9,733,355 B2 | 8/2017 | Chan et al. | |
| 9,848,523 B2 | 12/2017 | Sander et al. | |
| 9,883,626 B2 * | 2/2018 | Heim | A01C 21/005 |
| 9,943,027 B2 | 4/2018 | Sander et al. | |
| 2009/0241817 A1 * | 10/2009 | Eastin | A01C 23/00 |
| | | | 111/118 |
| 2011/0238269 A1 * | 9/2011 | Martin | A01F 15/08 |
| | | | 701/50 |
| 2013/0112122 A1 * | 5/2013 | Blomme | A01B 63/008 |
| | | | 111/149 |
| 2015/0208571 A1 | 7/2015 | Hahn et al. | |
| 2015/0305228 A1 * | 10/2015 | Zemenchik | A01B 71/02 |
| | | | 701/50 |
| 2016/0165789 A1 * | 6/2016 | Gervais | A01C 7/205 |
| | | | 700/275 |
| 2016/0302353 A1 * | 10/2016 | Wendte | A01C 21/005 |
| 2016/0334798 A1 * | 11/2016 | Foster | G05D 1/0274 |
| 2017/0094894 A1 * | 4/2017 | Heim | A01C 21/005 |
| 2018/0208058 A1 * | 7/2018 | Czapka | A01C 7/102 |
| 2019/0124826 A1 * | 5/2019 | Pickett | A01C 21/007 |
| 2019/0373797 A1 * | 12/2019 | Schoeny | A01C 7/203 |
| 2019/0373801 A1 * | 12/2019 | Schoeny | A01B 79/005 |
| 2019/0383650 A1 * | 12/2019 | Ferrari | G01D 21/00 |
| 2019/0392239 A1 * | 12/2019 | Ferrari | G06K 9/2027 |
| 2020/0037519 A1 * | 2/2020 | Wonderlich | B05B 9/06 |
| 2020/0037598 A1 * | 2/2020 | Wonderlich | A01C 7/105 |
| 2020/0068778 A1 * | 3/2020 | Schoeny | A01B 63/24 |
| 2020/0107488 A1 * | 4/2020 | Schoeny | A01B 67/00 |

* cited by examiner

SYSTEM AND METHOD FOR CONTROLLING THE SPEED OF A SEED-PLANTING IMPLEMENT BASED ON FURROW CLOSING ASSEMBLY PERFORMANCE

FIELD OF THE INVENTION

The present disclosure generally relates to seed-planting implements and, more particularly, to systems and methods for controlling the speed of a seed-planting implement being towed by a work vehicle based on furrow closing assembly performance.

BACKGROUND OF THE INVENTION

Modern farming practices strive to increase yields of agricultural fields. In this respect, seed-planting implements are towed behind a tractor or other work vehicle to disperse seed throughout a field. For example, seed-planting implements typically include one or more furrow forming tools or openers that excavate a furrow or trench in the soil. One or more dispensing devices of the seed-planting implements may, in turn, deposit the seeds into the furrow(s). After deposition of the seeds, a furrow closing assembly may close the furrow in the soil, such as by pushing the excavated soil into the furrow. Given its intended function, the performance of the furrow closing assembly may, in many circumstances, be affected by the speed at which the seed-planting implement is moved across the field.

Accordingly, an improved system and method for controlling the speed of a seed-planting implement based on the performance of a furrow closing assembly of the implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling the speed of a seed-planting implement. The system may include a furrow closing assembly having at least one ground engaging component configured to rotate relative to soil within a field as the agricultural implement is moved across the field, with the furrow closing assembly configured to close a furrow formed in the soil by the seed-planting implement. Furthermore, the system may include a sensor configured to capture data indicative of an operational parameter of the furrow closing assembly. Additionally, the system may include an implement-based controller supported on the seed-planting implement and being communicatively coupled to the sensor. As such, the implement-based controller may be configured to initiate control of a drive parameter of a work vehicle configured to tow the seed-planting implement based on sensor data received from the sensor in a manner that adjusts the speed of the seed-planting implement.

In another aspect, the present subject matter is directed to a method for controlling the speed of a seed-planting implement. The method may include monitoring, with an implement-based computing device installed on the seed-planting implement, an operational parameter of a furrow closing assembly of the seed-planting implement. The method may also include comparing, with the implement-based computing device, the monitored operational parameter to at least one threshold parameter value associated with a performance of the furrow closing assembly. Furthermore, when the monitored operational parameter exceeds or falls below the least one threshold parameter value, the method may include initiating, with the implement-based computing device, control of a drive parameter of a work vehicle configured to tow the seed-planting implement in a manner that adjusts the speed of the seed-planting implement.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling the speed of a seed-planting implement being towed by a work vehicle across a field. In several embodiments, the work vehicle may include a vehicle-based controller(s) configured to control one or more drive parameters of the work vehicle, such as one or more parameters of an engine, a transmission, and/or a braking actuator(s) of the work vehicle. Furthermore, the seed-planting implement may include a sensor(s) coupled thereto that is configured to capture data indicative of an operational parameter(s) of a furrow closing assembly of the implement. In this regard, an implement-based controller(s) supported on the seed-planting implement may be configured to initiate control of the drive parameter(s) of the work vehicle based on sensor data received from the operational parameter sensor(s) in a manner that adjusts the speed of the implement. For instance, upon receipt of the data from the operational parameter sensor(s), the implement-based controller(s) may be configured to transmit signals to the vehicle-based controller(s) (e.g., via ISOBUS Class 3 communications protocols (ISO 11783-9)) requesting the vehicle-based controller(s) to control the operation of the engine, the transmission, and/or braking actuator(s) in a manner that adjusts or varies the speed of the seed-planting implement. As such, based on the request from the implement-based controller(s), the vehicle-based controller(s) may control the engine, the transmission, and/or braking actuator(s) such that the speed of the seed-planting implement is adjusted or varied.

Figure 1:
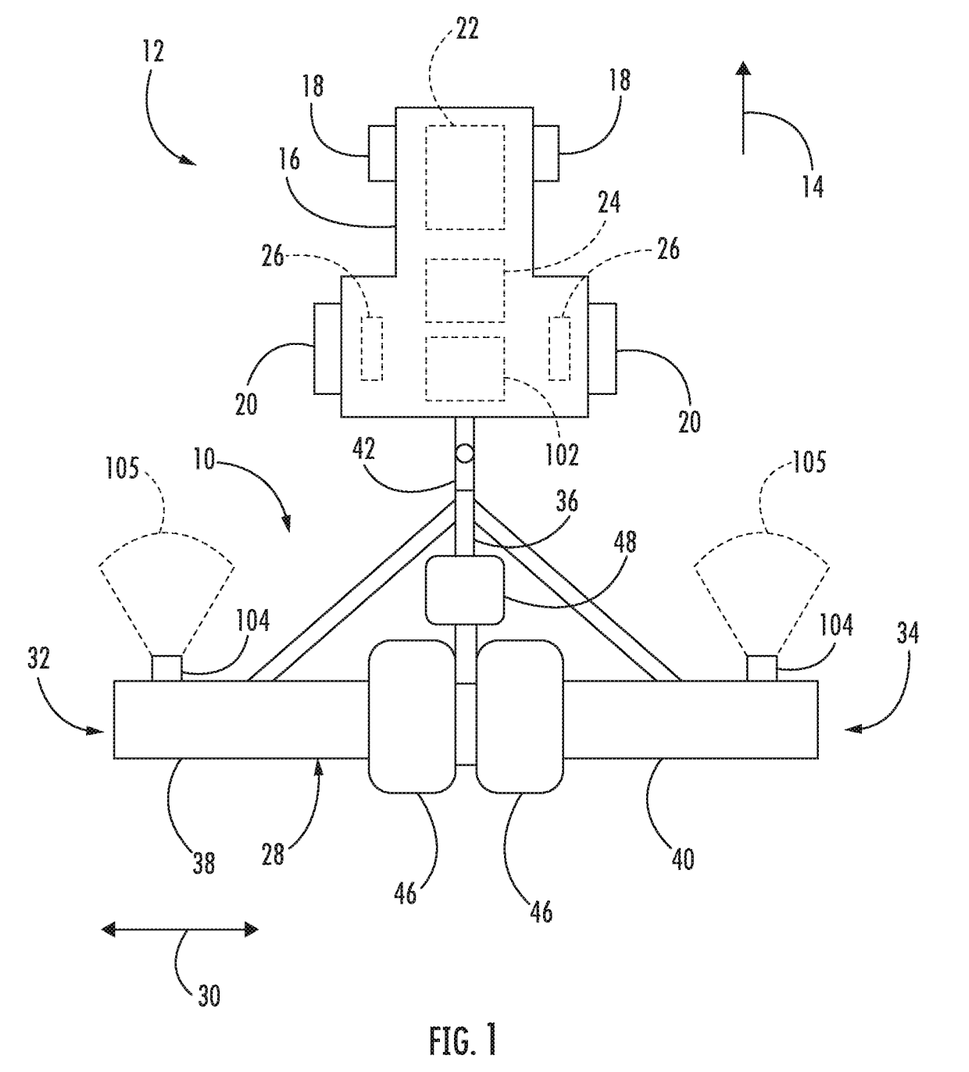
FIG. 1 illustrates a top view of one embodiment of an agricultural implement coupled to a work vehicle in accordance with aspects of the present subject matter.
Figure 2:
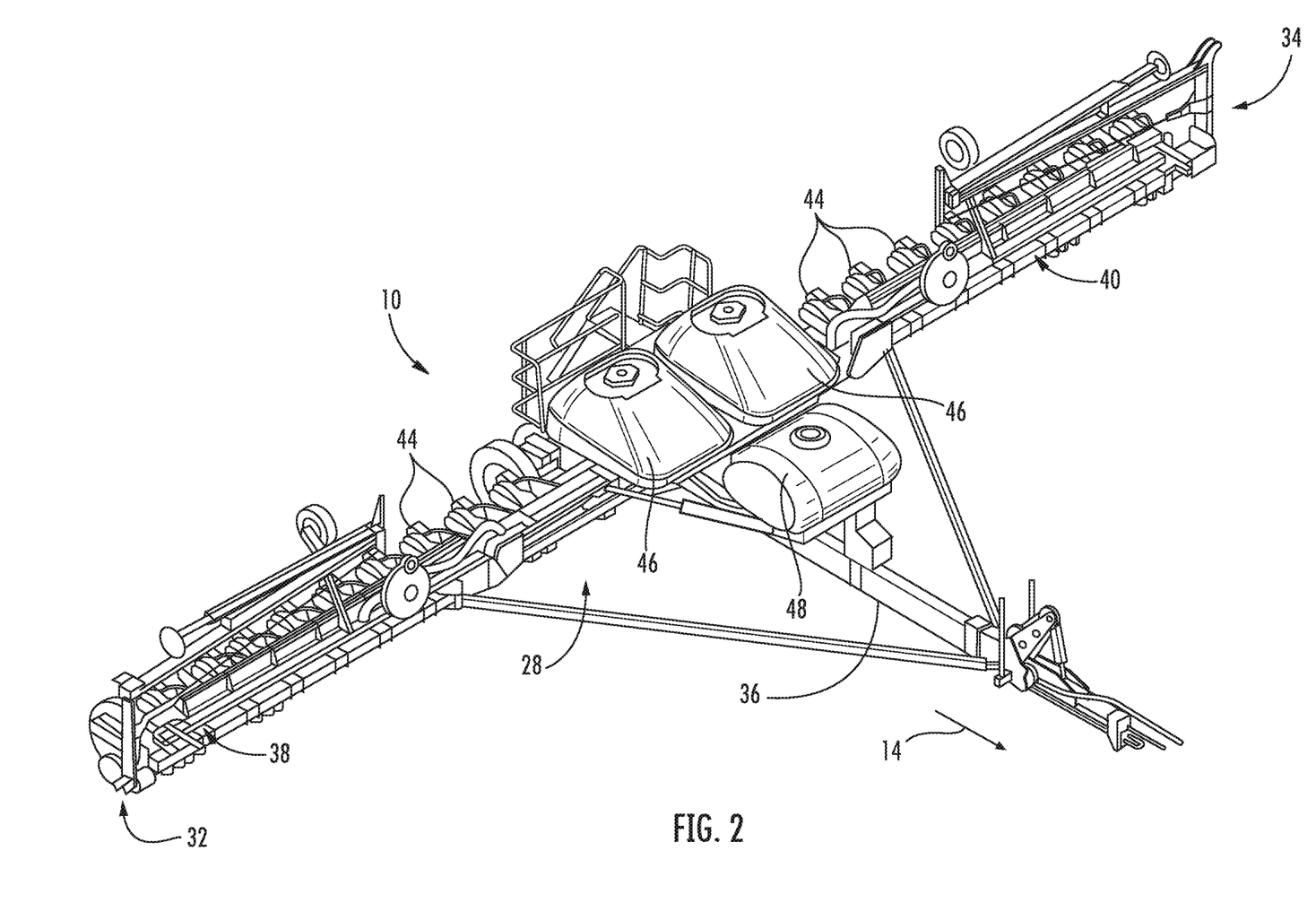
FIG. 2 illustrates a perspective view of the agricultural implement shown in FIG. 1, particularly illustrating various components of the implement.

Referring now to the drawings, FIGS. 1 and 2 illustrate differing views of one embodiment of a seed-planting implement 10 in accordance with aspects of the present subject matter. Specifically, FIG. 1 illustrates a top view of the seed-planting implement 10 coupled to a work vehicle 12. Additionally, FIG. 2 illustrates a perspective view of the implement 10, particularly illustrating various components of the implement 10.

In general, the work vehicle 12 may be configured to tow the implement 10 across a field in a direction of travel (e.g., as indicated by arrow 14 in FIG. 1). As shown, the work vehicle 12 may be configured as an agricultural tractor and the implement 10 may be configured as an associated planter. However, in other embodiments, the work vehicle 12 may be configured as any other suitable type of vehicle, such as an agricultural harvester, a self-propelled sprayer, and/or the like. Similarly, the implement 10 may be configured as any other suitable type of implement, such as seeder (e.g., a seed disc drill) or another seed dispensing implement, a side dresser or another fertilizer dispensing implement, a strip tiller, and/or the like.

As shown in FIG. 1, the work vehicle 12 may include a frame or chassis 16 configured to support or couple to a plurality of components. For example, a pair of steerable front wheels 18 and a pair of driven rear wheels 20 may be coupled to the frame 16. The wheels 18, 20 may be configured to support the work vehicle 12 relative to the ground and move the work vehicle 12 in the direction of travel 14 across the field. However, it should be appreciated that, in alternative embodiments, the front wheels 18 may be driven in addition to or in lieu of the rear wheels 20. Additionally, it should be appreciated that, in further embodiments, the work vehicle 12 may include track assemblies (not shown) in place of the front and/or rear wheels 18, 20.

Furthermore, the work vehicle 12 may include one or more devices for adjusting the speed at which the work vehicle 12 moves across the field in the direction of travel 14. Specifically, in several embodiments, the work vehicle 12 may include an engine 22 and a transmission 24 mounted on the frame 16. As is generally understood, the engine 22 may be configured to generate power by combusting or otherwise burning a mixture of air and fuel. The transmission 24 may, in turn, be operably coupled to the engine 22 and may provide variably adjusted gear ratios for transferring the power generated by the engine power to the driven wheels 20. For example, increasing the power output by the engine 22 (e.g., by increasing the fuel flow to the engine 22) and/or shifting the transmission 24 into a higher gear may increase the speed at which the work vehicle 12 moves across the field. Conversely, decreasing the power output by the engine 22 (e.g., by decreasing the fuel flow to the engine 22) and/or shifting the transmission 24 into a lower gear may decrease the speed at which the work vehicle 12 moves across the field. Additionally, the work vehicle 12 may include one or more braking actuators 26 that, when activated, reduce the speed at which the work vehicle 12 moves across the field, such as by converting energy associated with the movement of the work vehicle 12 into heat. For example, in one embodiment, the braking actuator(s) 26 may correspond to a suitable hydraulic cylinder(s) configured to push a stationary frictional element(s) (not shown), such as a brake shoe(s) or a brake caliper(s), against a rotating element(s) (not shown), such as a brake drum(s) or a brake disc(s). However, it should be appreciated that the braking actuator(s) 26 may any other suitable hydraulic, pneumatic, mechanical, and/or electrical component(s) configured to convert the rotation of the rotating element(s) into heat. Furthermore, although FIG. 1 illustrates one braking actuator 26 provided in operative association with each of the driven wheels 20, it should be appreciated that the work vehicle 12 may include any other suitable number of braking actuators 26. For example, in one embodiment, the work vehicle 12 may include one braking actuator 26 provided in operative association with each of the steerable wheels 18 in addition to or in lieu of the driven wheels 20.

Additionally, as shown in FIG. 1, a location sensor 102 may be provided in operative association with the work vehicle 12. In this regard, the location sensor 102 may be configured to detect a parameter associated with a geographical or physical location of the work vehicle 12 within the field. For instance, in one embodiment, the location sensor 102 may correspond to a GNSS-based receiver configured to detect the GNSS coordinates of the work vehicle 12. However, it should be appreciated that, in alternative embodiments, the location sensor 102 may be configured as any suitable location sensing device for detecting the location of the work vehicle 12.

Referring still to FIGS. 1 and 2, the implement 10 may include a frame or toolbar 28 configured to support and/or couple to one or more components of the implement 10. Specifically, in several embodiments, the toolbar 28 may extend along a lateral direction 30 between a first side 32 of the implement 10 and a second side 34 of the implement 10. As shown, the toolbar 28 may include a center section 36 and a pair of wing sections 38, 40. In one embodiment, the wing sections 38, 40 may be pivotably coupled to the center section 36 in a manner that permits the wing sections 38, 40 to fold forward to reduce the lateral width of the implement 10, such as during storage or transportation of the implement 10 on a road. Furthermore, a tow bar 42 may be coupled to the center section 36 to allow the implement 10 to be towed by the work vehicle 12. Additionally, as shown in FIG. 2, the wing sections 38, 40 may generally be configured to support a plurality of seed planting units (or row units) 44. As will be described below, each row unit 44 may be configured to deposit seeds at a desired depth beneath the soil surface and at a desired seed spacing as the implement 10 is being towed by the work vehicle 12, thereby establishing rows of planted seeds. In some embodiments, the bulk of the seeds to be planted may be stored in one or more hoppers or seed tanks 46 mounted on or otherwise supported by the toolbar 28. Thus, as seeds are planted by the row units 44, a pneumatic distribution system (not shown) may distribute additional seeds from the seed tanks 46 to the individual row units 44.

Additionally, one or more fluid tanks 48 mounted on or otherwise supported by the toolbar 28 may store agricultural fluids, such as insecticides, herbicides, fungicides, fertilizers, and/or the like, which may be sprayed onto the seeds during planting.

It should be appreciated that, for purposes of illustration, only a portion of the row units 44 of the implement 10 have been shown in FIG. 2. In general, the implement 10 may include any number of row units 44, such as six, eight, twelve, sixteen, twenty-four, thirty-two, or thirty-six row units. In addition, it should be appreciated that the lateral spacing between row units 44 may be selected based on the type of crop being planted. For example, the row units 44 may be spaced approximately thirty inches from one another for planting corn, and approximately fifteen inches from one another for planting soybeans.

Furthermore, as shown in FIG. 1, one or more field sensors 104 may be provided in operative association with the implement 10. Specifically, in several embodiments, the field sensor(s) 104 may be configured to capture data indicative of a field condition(s) of the field across which the implement 10 is being moved, such as the field roughness, the residue coverage or sizing, the soil moisture, the presence of ridges and/or furrows, and/or the like. As such, in one embodiment, the field sensor(s) 104 may be a vision-based or Radio Detection and Ranging (RADAR) based sensor(s) mounted or installed on the toolbar 28 of the implement 10 such that the field sensor(s) 104 has a field of view or sensor detection range (e.g., as indicated by dashed lines 105 in FIG. 1) directed towards a section of the field in front of the implement 10. As such, the field sensor(s) 104 may be configured to capture field data (e.g., vision-based or RADAR-based data) of the field in front of the implement 10, with such field data being indicative of the field condition(s) which the implement 10 may encounter as the implement 10 is moved in the direction of travel 14. For example, in the illustrated embodiment, one field sensor 104 may be provided at the first side 32 of the implement 10 to allow the field sensor 104 to capture field data of a section of the field disposed in front of the first side 32 of the implement 10. Similarly, as shown in FIG. 1, a second field sensor 104 may be provided at or adjacent to the second side 34 of the implement 10 to allow the field sensor 104 to capture field data of a section of the field disposed in front of the second side 34 of the implement 10. It should be appreciated that, in alternative embodiments, the field sensor(s) 104 may be installed at any other suitable location(s) on the implement 10. Furthermore, it should be appreciated that the implement 10 may include only one field sensor 104 or more than two field sensors 104.

Moreover, it should be appreciated that the field sensor(s) 104 may correspond to any suitable sensing device(s) configured to detect or capture vision-based data (e.g., images, point cloud data, and/or the like) or RADAR-based data associated with the section of the field within an associated field of view. For example, in several embodiments, the field sensor(s) 104 and/or the field sensor(s) 104 may correspond to Light Detection and Ranging (LIDAR) sensors or RADAR sensors. However, in alternative embodiments, the field sensor(s) 104 may correspond to any other suitable vision-based or beam-based sensing device(s), such as optical beam sensors and/or cameras.

It should be appreciated that the configuration of the implement 10 and the work vehicle 12 described above and shown in FIGS. 1 and 2 is provided only to place the present subject matter in an exemplary field of use. Thus, it should be appreciated that the present subject matter may be readily adaptable to any manner of implement, work vehicle, and/or hitch assembly configurations.

Figure 3:
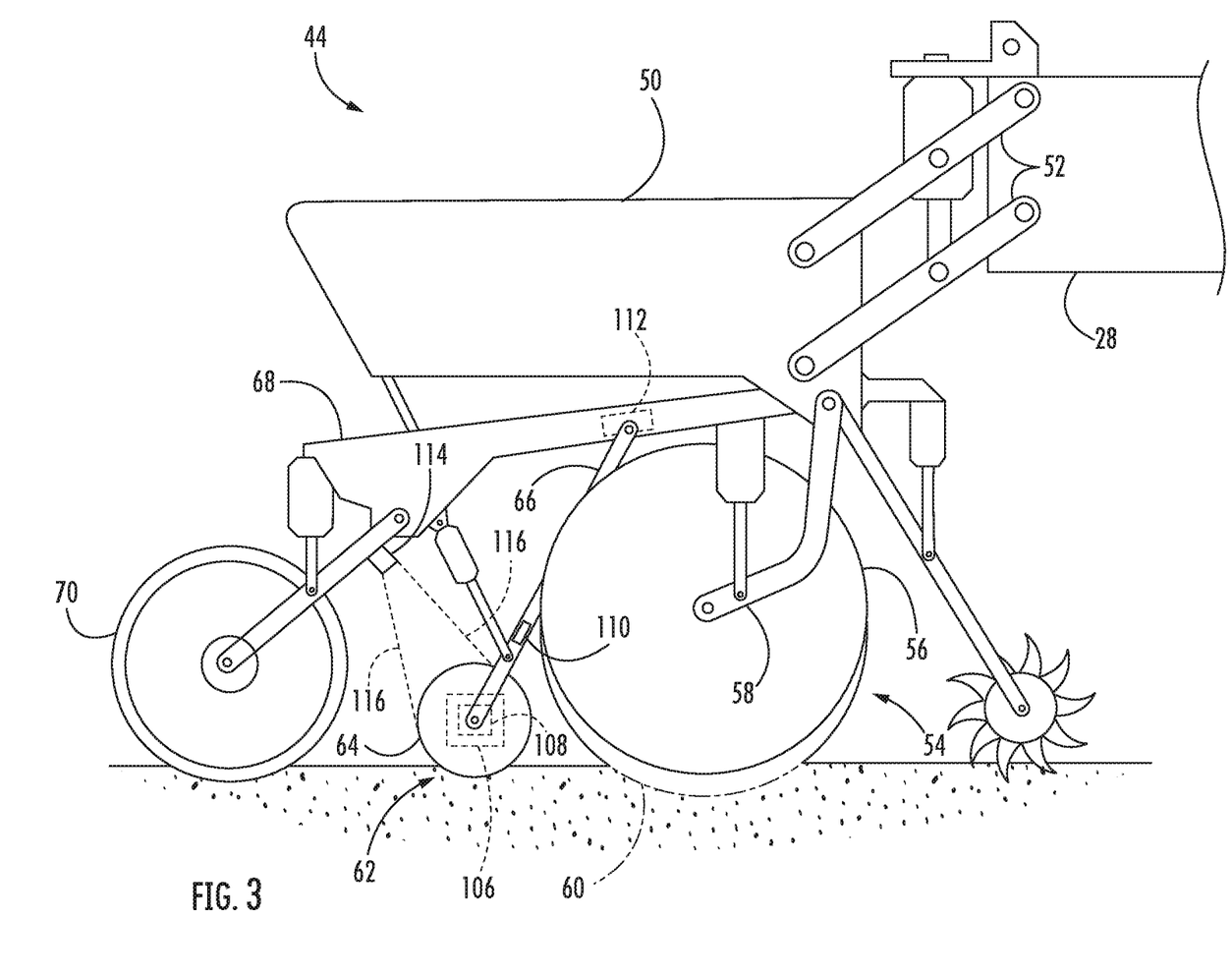
FIG. 3 illustrates a side view of one embodiment of a row unit suitable for use with a seed-planting implement in accordance with aspects of the present subject matter.

Referring now to FIG. 3, a side view of one embodiment of a row unit 44 is illustrated in accordance with aspects of the present subject matter. As shown, the row unit 44 may include a frame 50 adjustably coupled to the toolbar 28 by links 52. For example, one end of each link 52 may be pivotably coupled to the frame 50, while an opposed end of each link 52 may be pivotally coupled to the toolbar 28. In one embodiment, the links 52 may be parallel. However, it should be appreciated that, in alternative embodiments, the row unit 44 may be coupled to the toolbar 28 in any other suitable manner. For example, the links 52 may be fixedly coupled to the frame 50 and/or the links 52 may be non-parallel. Additionally, in a further embodiment, the implement 10 may not include the links 52. In such instance, the implement 10 may include other components for coupling each row unit 44 to the toolbar 28.

As shown in FIG. 3, the row unit 44 also includes a furrow opening assembly 54. For example, in one embodiment, the furrow opening assembly 54 may include a gauge wheel 56 operatively coupled to the frame 50 of the row unit 44 via a support arm 58. Furthermore, the opening assembly 54 may also include one or more opener discs 60 configured to excavate a furrow or trench in the soil. As is generally understood, the gauge wheel 56 may be configured to engage the top surface of the soil as the implement 10 is moved across the field. In this regard, the height of the opener disc(s) 60 may adjusted with respect to the position of the gauge wheel 56 to set the desired depth of the furrow being excavated.

Moreover, as shown, the row unit 44 may include a furrow closing assembly 62. Specifically, in several embodiments, the furrow closing assembly 62 may include a pair of closing discs 64 positioned relative to each other in a manner that permits soil to flow between the discs 64 as the implement 10 is being moved across the field. As such, the closing discs 64 may be configured to close the furrow after seeds have been deposited therein, such as by pushing the excavated soil into the furrow. Furthermore, the furrow closing assembly 62 may include a support arm 66 configured to adjustably couple the closing discs 64 to the frame assembly 50. For example, one end of the support arm 66 may be pivotably coupled to the closing discs 64, while an opposed end of the support arm 66 may be pivotably coupled to a chassis arm 68, which is, in turn, coupled to the frame 50. However, it should be appreciated that, in alternative embodiments, the closing discs 64 may be coupled to the frame 50 in any other suitable manner. Furthermore, it should be appreciated that, in alternative embodiments, the furrow closing assembly 62 may include any other suitable number of closing discs 64, such as one closing disc 64 or three or more closing discs 64. Additionally, the row unit 44 may include a press wheel 70 configured to roll over the closed furrow to firm the soil over the seed and promote favorable seed-to-soil contact.

Furthermore, a rotational speed sensor 106 may be provided in operative association with the furrow closing assembly 62 of the row unit 44. As such, the rotational speed sensor 106 may be configured to detect a parameter associated with the rotational speed of one or more of the closing discs 64 as the implement 10 is moved across the field. For example, in one embodiment, the rotational speed sensor 106 may be configured as a Hall Effect sensor configured to detect the rotational speed of the closing disc(s) 64 relative to an axle or shaft on which the closing disc(s) 64 are mounted relative to the support arm 66. However, it should be appreciated that, in alternative embodiments, the rotational speed sensor 106 may be configured as any other suitable device for sensing or detecting the rotational speed of the closing disc(s) 64.

Moreover, a load sensor 108 may be provided in operative association with the furrow closing assembly 62 of the row unit 44. As such, the load sensor 108 may be configured to detect a parameter associated with the load exerted on the furrow closing assembly 62 as the implement 10 is moved across the field. For example, in one embodiment, the load sensor 108 may be configured as a load pin positioned between the closing disc(s) 64 and the support arm 66. In another embodiment, the load pin may be positioned between the support arm 66 and the frame 50, thereby permitting the load pin to detect a parameter associated with the load exerted on both closing discs 64. However, it should be appreciated that, in alternative embodiments, the load sensor 108 may be configured as any other suitable device for sensing or detecting the load on the closing disc(s) 64, such as a strain gauge.

As shown in FIG. 3, an acceleration sensor 110 may be provided in operative association with the furrow closing assembly 62 of the row unit 44. As such, the acceleration sensor 110 may be configured to detect a parameter(s) associated with movement or motion of the furrow closing assembly 62 relative to the frame 50 of the row unit 44. For instance, in one embodiment, the acceleration sensor 110 may correspond to a gyroscope or an inertial measurement unit (IMU). However, it should be appreciated that, in alternative embodiments, the acceleration sensor 110 may be configured as any suitable acceleration sensing device for detecting relative movement between the furrow closing assembly 62 and the frame 50.

Additionally, a depth sensor 112 may be provided in operative association with the furrow closing assembly 62 of the row unit 44. As such, the depth sensor 112 may be configured to detect a parameter associated with the depth to which the closing discs 64 penetrate soil. For example, in one embodiment, the depth sensor 112 may be configured as a potentiometer configured to detect the angle defined between the support arm 66 on which the closing discs 64 are mounted and the chassis arm 68 to which the support arm 66 is coupled. The angle between the support arm 66 and the chassis arm 68 may, in turn, be indicative of the penetration depth of the closing discs 64. However, it should be appreciated that, in alternative embodiments, the depth sensor 112 may be configured as any other suitable device for sensing or detecting the penetration depth of the closing discs 64.

Additionally, in accordance with aspects of the present subject matter, a plugging sensor 114 may be provided in operative association with the row unit 44. Specifically, in several embodiments, the plugging sensor 114 may be configured to capture data indicative of "plugging" of the furrow closing assembly 62. In general, the furrow closing assembly 62 may be plugged when soil and/or residue become trapped between adjacent closing discs 64 in a manner that prevents the soil from flowing through the furrow closing assembly 62 as the implement 10 is moved across the field. In such instances, the closing discs 64 may not rotate freely relative to the ground when the furrow closing assembly 62 is plugged. For example, in one embodiment, the plugging sensor 114 may be a vision-based or Radio Detection and Ranging (RADAR) based sensor(s) mounted or installed on the row unit 44 such that the plugging sensor 114 has a field of view or sensor detection range (e.g., as indicated by dashed lines 116 in FIG. 2) directed towards the closing discs 64 of the furrow closing assembly 62. As such, the plugging sensor 114 may be configured to capture data (e.g., vision-based or RADAR-based data) of the soil flowing through the furrow closing assembly 62 as the implement 10 is moved across the field.

It should be appreciated that the plugging sensor 114 may correspond to any suitable sensing device(s) configured to detect or capture vision-based data (e.g., images, point cloud data, and/or the like) or RADAR-based data associated with the soil within an associated field of view. For example, in several embodiments, the plugging sensor 114 may correspond to Light Detection and Ranging (LIDAR) sensors or RADAR sensors. However, in alternative embodiments, the plugging sensor 114 may correspond to any other suitable vision-based or beam-based sensing device(s), such as optical beam sensors and/or cameras.

Furthermore, it should be appreciated that the configuration of the row unit 44 described above and shown in FIG. 3 is provided only to place the present subject matter in an exemplary field of use. Thus, it should be appreciated that the present subject matter may be readily adaptable to any manner of seed planting unit configuration.

Figure 4:
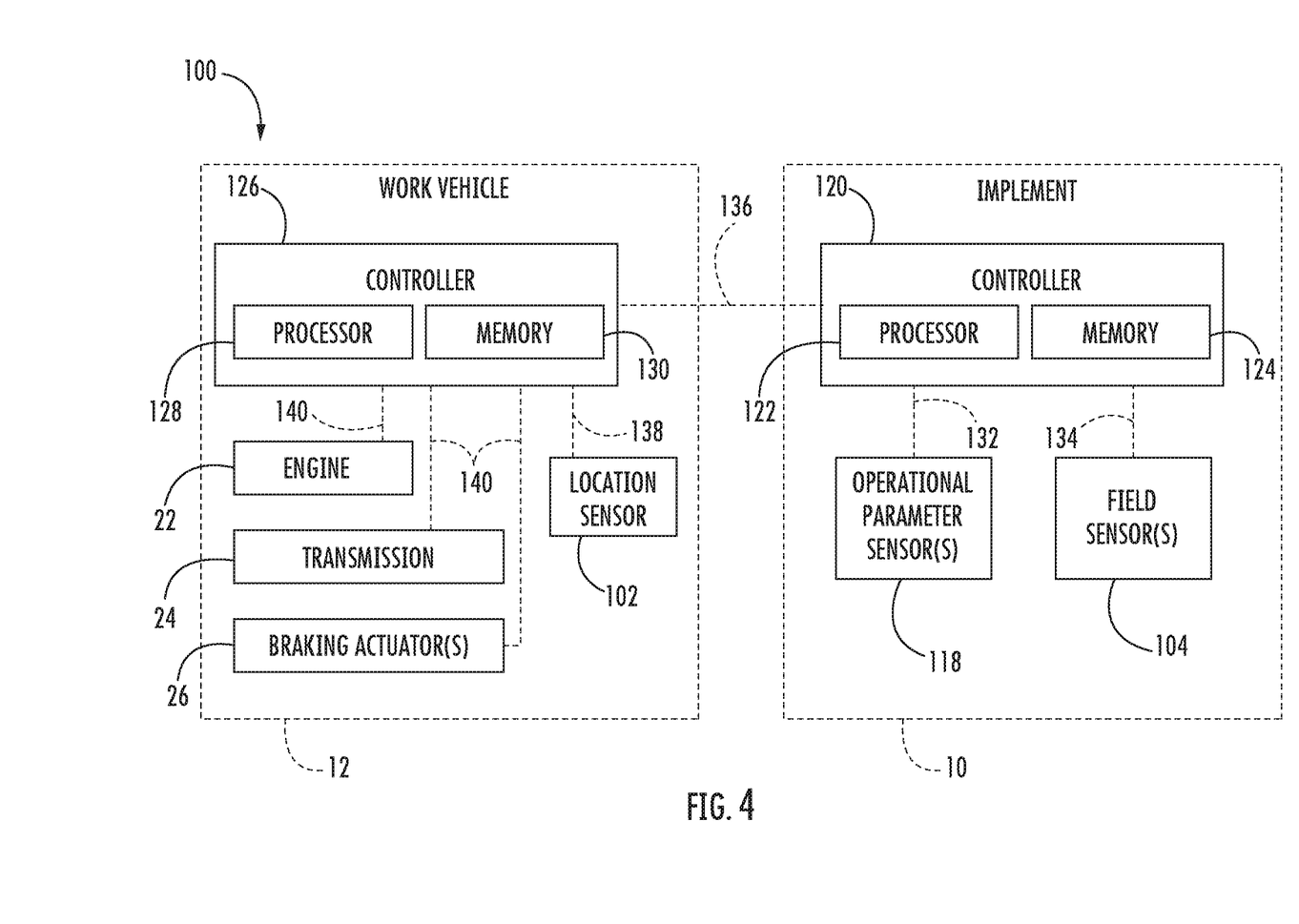
FIG. 4 illustrates a schematic view of one embodiment of a system for controlling the speed of a seed-planting implement in accordance with aspects of the present subject matter.

Referring now to FIG. 4, a schematic view of one embodiment of a system 100 for controlling the speed of an agricultural implement is illustrated in accordance with aspects of the present subject matter. In general, the system 100 will be described herein with reference to the implement 10 and the work vehicle 12 described above with reference to FIGS. 1-3. However, it should be appreciated by those of ordinary skill in the art that the disclosed system 100 may generally be utilized with implements having any other suitable implement configuration and/or work vehicles having any other suitable vehicle configuration.

As shown in FIG. 4, the system 100 may include one or more components of the implement 10 and/or the work vehicle 12. Specifically, in several embodiments, the system 100 may include one or more operational parameter sensors 118 configured to capture data indicative of one or more operational parameters of the furrow closing assembly 62. For example, in one embodiment, the operational parameter sensor(s) 118 may include the rotational speed sensor 106, the load sensor 108, the acceleration sensor 110, the depth sensor 112, and/or the plugging sensor 114. Additionally, the system 100 may include at least one rotating ground engaging component of the furrow closing system 62. As used herein, a rotating ground engaging component may be any component of the implement 10 configured to rotate relative to the soil as the implement 10 is moved across a field. For example, in one embodiment, the rotating ground engaging component(s) may correspond to the closing discs 64. However, the system 100 may include any other rotating ground engaging components of the furrow closing assembly 62, such as one or more pinch-style closing wheels (not shown). In fact, the system 100 may include any suitable components of the furrow closing assembly 62 that roll along the top surface of the ground or penetrate the soil. Furthermore, it should be appreciated that, in alternative embodiments, the system 100 may include any other suitable components of the implement 10 and/or the work vehicle 12.

In accordance with aspects of the present subject matter, the system 100 may include one or more implement-based controllers 120 positioned on and/or within or otherwise associated with the implement 10. In general, the implement controller(s) 120 may comprise any suitable processor-based device known in the art, such as a computing device or any suitable combination of computing devices. Thus, in several embodiments, the controller(s) 120 may include one or more processor(s) 122 and associated memory device(s) 124 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 124 of the controller(s) 120 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 124 may generally be configured to store suitable computer-readable instructions that, when implemented by the processor(s) 122, configure the implement controller(s) 120 to perform various computer-implemented functions, such as one or more aspects of the method 200 described below with reference to FIG. 5. In addition, the implement controller(s) 120 may also include various other suitable components, such as a communications circuit or module, one or more input/output channels, a data/control bus and/or the like.

It should be appreciated that the implement controller(s) 120 may correspond to an existing controller(s) of the implement 10, itself, or the controller(s) 120 may correspond to a separate processing device(s). For instance, in one embodiment, the implement controller(s) 120 may form all or part of a separate plug-in module that may be installed in association with the implement 10 to allow for the disclosed systems and methods to be implemented without requiring additional software to be uploaded onto existing control devices of the implement 10. It should also be appreciated that the functions of the implement controller(s) 120 may be performed by a single processor-based device or may be distributed across any number of processor-based devices, in which instance such devices may be considered to form part of the implement controller(s) 120.

Moreover, the system 100 may include one or more work vehicle-based controllers 126 positioned on and/or within or otherwise associated with the work vehicle 12. In general, the vehicle controller(s) 126 may comprise any suitable processor-based device known in the art, such as a computing device or any suitable combination of computing devices. Thus, in several embodiments, the controller(s) 126 may include one or more processor(s) 128 and associated memory device(s) 130 configured to perform a variety of computer-implemented functions. Such memory device(s) 130 may generally be configured to store suitable computer-readable instructions that, when implemented by the processor(s) 128, configure the vehicle controller(s) 126 to perform various computer-implemented functions, such as one or more aspects of the method 200 described below with reference to FIG. 5. In addition, the vehicle controller(s) 126 may also include various other suitable components, such as a communications circuit or module, one or more input/output channels, a data/control bus and/or the like.

It should be appreciated that the vehicle controller(s) 126 may correspond to an existing controller(s) of the work vehicle 12, itself, or the controller(s) 126 may correspond to a separate processing device. For instance, in one embodiment, the vehicle controller(s) 126 may form all or part of a separate plug-in module that may be installed in association with the work vehicle 12 to allow for the disclosed systems and methods to be implemented without requiring additional software to be uploaded onto existing control devices of the work vehicle 12. It should also be appreciated that the functions of the vehicle controller(s) 126 may be performed by a single processor-based device or may be distributed across any number of processor-based devices, in which instance such devices may be considered to form part of the vehicle controller(s) 126. For instance, the functions of the vehicle controller(s) 126 may be distributed across multiple application-specific controllers, such as an engine controller, a transmission controller, a brake system controller, a navigation controller, and/or the like.

In several embodiments, the implement controller(s) 120 may be configured to monitor one or more operational parameters indicative of the performance of the furrow closing assembly 62 based on sensor data received from the operational parameter sensor(s) 116. Specifically, the implement controller(s) 120 may be communicatively coupled to the operational parameter sensor(s) 116 via a wired or wireless connection to allow sensor data (e.g., indicated by dashed lines 132 in FIG. 4) to be transmitted from the sensor(s) 116 to the controller(s) 120. The implement controller(s) 120 may then be configured determine or estimate the operational parameter(s) based on the sensor data 132 received from the operational parameter sensor(s) 116. For instance, the implement controller(s) 120 may include a look-up table, suitable mathematical formula, and/or algorithms stored within its memory 118 that correlates the sensor data 132 to the operational parameter(s).

Furthermore, in several embodiments, the implement controller(s) 120 may be configured to compare the monitored operational parameter(s) to one or more threshold parameters or desired operational parameter ranges associated with the performance of the furrow closing assembly 62. For instance, the implement controller(s) 120 may be configured to compare the values associated with the monitored parameter(s) to a predetermined operational parameter range(s) defined for the implement 10. Thereafter, in the event that the monitored operational parameter(s) exceeds a maximum operational parameter threshold for the given operational parameter range or falls below a minimum operational parameter threshold for such range (thereby indicating that the operational parameter(s) of the implement 10 may be too high or too low such that the performance of the furrow closing assembly 62 is poor), the implement controller(s) 120 may be configured to initiate control of the drive parameter(s) of the work vehicle 12. As will be described below, the drive parameter(s) may be controlled in a manner that adjusts the speed of the implement 10.

In one embodiment, the operational parameter(s) monitored by the implement controller(s) 120 may be indicative of the rotational speed of the rotating ground engaging components (e.g., the closing discs 64) of the furrow closing assembly 62. As indicated above, in one embodiment, the operational parameter sensor(s) 116 may include the rotational speed sensor 106. In this regard, the implement controller(s) 120 may be configured to monitor the rotational speed of the rotating ground engaging components based on sensor data 132 received from the operational parameter sensor(s) 116. Thereafter, in the event that the monitored rotational speed falls below a minimum rotational speed value set for the rotating ground engaging components 64 (thereby indicating that the rotating ground engaging components are not rotating freely such that the performance of the furrow closing assembly 62 is poor), the implement controller(s) 120 may be configured to initiate control of the drive parameter(s) of the work vehicle 12 in a manner such that the speed of the implement 10 is reduced.

In another embodiment, the operational parameter(s) monitored by the implement controller(s) 120 may be indicative of the load exerted on the furrow closing assembly 62. As indicated above, in one embodiment, the operational parameter sensor(s) 116 may include the load sensor 108. In this regard, the implement controller(s) 120 may be configured to monitor the load exerted on the furrow closing assembly 62 based on sensor data 132 received from the operational parameter sensor(s) 116. Thereafter, in the event that the monitored load exceeds a maximum load value set for the rotating ground engaging components (thereby indicating that the load on the furrow closing assembly 62 is too great such that the performance of the furrow closing assembly 62 may be poor), the implement controller(s) 120 may be configured to initiate control of the drive parameter(s) of the work vehicle 12 in a manner such that the speed of the implement 10 is reduced.

In a further embodiment, the operational parameter(s) monitored by the implement controller(s) 120 may be indicative of the acceleration of the furrow closing assembly 62 relative to the associated frame 50. As indicated above, in one embodiment, the operational parameter sensor(s) 116 may include the acceleration sensor 110. In this regard, the implement controller(s) 120 may be configured to monitor the acceleration of the furrow closing assembly 62 based on sensor data 132 received from the operational parameter sensor(s) 116. Thereafter, in the event that the monitored acceleration exceeds a maximum acceleration value set for the furrow closing assembly 62 (thereby indicating that the furrow closing assembly 62 is bouncing relative to the ground in a manner resulting in poor furrow closing assembly performance), the implement controller(s) 120 may be configured to initiate control of the drive parameter(s) of the work vehicle 12 in a manner such that the speed of the implement 10 is reduced.

In yet another embodiment, the operational parameter(s) monitored by the implement controller(s) 120 may be indicative of the penetration depth of the rotating ground engaging components, such as the furrow closing discs 64. As indicated above, in one embodiment, the operational parameter sensor(s) 116 may include the depth sensor 112. In this regard, the implement controller(s) 120 may be configured to monitor the penetration depth of the furrow closing discs 64 based on sensor data 132 received from the operational parameter sensor(s) 116. Thereafter, in the event that the monitored depth falls below a minimum depth value set for the closing discs 64 (thereby indicating that the closing discs 64 are too shallow such that the performance of the furrow closing assembly 62 may be poor), the implement controller(s) 120 may be configured to initiate control of the drive parameter(s) of the work vehicle 12 in a manner such that the speed of the implement 10 is reduced.

Additionally, in several embodiments, the implement controller(s) 120 may be configured to initiate control of the drive parameter(s) of the work vehicle 12 based on data received from the plugging sensor 114. As indicated above, in one embodiment, the operational parameter sensor(s) 116 may include the plugging sensor 114. In this regard, the implement controller(s) 120 may be configured to receive sensor data 132 received from the operational parameter sensor(s) 116, with such data 132 being indicative of the soil flowing through the furrow closing assembly 62 as the implement 10 is moved across the field. In this regard, the implement controller(s) 120 may be configured to process or analyze the received data 132 to determine when the furrow closing assembly 62 is plugged or soil is otherwise not properly flowing through the furrow closing assembly 62. For example, the implement controller(s) 120 may include any suitable data processing algorithms stored within its memory 132 or may otherwise use any suitable data processing techniques to determine when the furrow closing assembly 62 is plugged based on the data 132. Thereafter, in the event that the furrow closing assembly 62 is plugged or the soil is otherwise not properly flowing through the furrow closing assembly 62, the implement controller(s) 120 may be configured to initiate control of the drive parameter(s) of the work vehicle 12 in a manner such that the speed of the implement 10 is reduced.

Moreover, in several embodiments, the implement controller(s) 120 may be configured to initiate control of the drive parameter(s) of the work vehicle 12 to adjust the speed of the implement 10 based on both the operational parameter(s) and one or more field conditions of the field across which the implement 10 is being towed. Specifically, the implement controller(s) 120 may be communicatively coupled to the field sensor(s) 104 via wired or wireless connection to allow the field data (e.g., as indicated by dashed line 134 in FIG. 4) to be transmitted from the field sensor(s) 104 to the controller(s) 120. In this regard, the implement controller(s) 120 may be configured to process or analyze the received field data 134 to determine one or more field condition parameters associated with the field, such as the roughness of the field. In this regard, the implement controller(s) 120 may be configured to execute any suitable data processing algorithms stored within its memory(ies) 124 or otherwise use any suitable data processing techniques to determine the field condition parameter(s) based on the received field data 134. In another embodiment, the implement controller(s) 120 may include field data (e.g., a previously captured swath map of the field) stored within its memory(ies) 124. In such embodiment, the implement controller(s) 114 may be configured to compare the location of the implement 10 (e.g., as determined based on the location data received from the location sensor 102) to the stored field data to identify the field condition parameter(s) of the section of the field proximate to the implement 10. Thereafter, in the event that the determined field condition parameter(s) exceeds a maximum field condition parameter threshold for the given field condition parameter range or falls below a minimum field condition parameter threshold for such range (thereby indicating that the field condition parameter may be too high or too low such that the performance of the furrow closing assembly 62 is poor), the implement controller(s) 120 may be configured to initiate control of the drive parameter(s) of the work vehicle 12. For example, in one embodiment, when it is determined that the monitored field roughness has exceeded a predetermined field roughness threshold, the implement controller(s) 120 may be configured to initiate control of the drive parameter(s) of the work vehicle 12 in a manner such that the speed of the implement 10 is adjusted (e.g., increased).

In accordance with aspects of the present subject matter, the implement controller(s) 120 may be configured to request that the vehicle controller(s) 126 control the drive parameter(s) of the work vehicle 12. Specifically, as shown in FIG. 4, the implement controller(s) 120 may be communicatively coupled to the vehicle controller(s) 126 via a wired or wireless connection to allow request signals (e.g., indicated by dashed lines 136 in FIG. 4) to be transmitted from the implement controller(s) 120 to the vehicle controller(s) 126. For example, in one embodiment, the request signals 136 may be transmitted from the implement controller(s) 120 to the vehicle controller(s) 126 via ISOBUS Class 3 (ISO 11783-9) communications protocols. However, in alternative embodiments, the request signals 136 may be transmitted via suitable CAN bus communications protocols or any other suitable communications protocols. Upon receipt of the request signals 136, the vehicle controller(s) 126 may be configured to determine whether to control the drive parameter(s) in the manner requested by the implement controller(s) 120.

In one embodiment, the vehicle controller(s) 126 may be configured to determine when to control the drive parameter(s) in the manner requested by the implement controller(s) 120 based on the location of the work vehicle 12 within the field. Specifically, the vehicle controller(s) 126 may be communicatively coupled to the location sensor 102 via wired or wireless connection to allow location data (e.g., as indicated by dashed line 138 in FIG. 4) to be transmitted from the location sensor 102 to the vehicle controller(s) 126. As such, the vehicle controller(s) 126 may be configured to determine or estimate the current location of the vehicle 12 within the field based on the received location data 138. For example, the vehicle controller(s) 126 may be configured to compare this determined location to a map stored within its memory(ies) 130 to determine the location of the vehicle 12 within the field. Based on the location of the work vehicle 12 within the field, the vehicle controller(s) 126 may be configured to determine when the performance of field operations by the implement 10 has ceased, such as when the vehicle 12 is positioned proximate to and/or within a headland. In such instances, the vehicle controller(s) 126 may be configured to ignore the request signals 136 received from the implement controller(s) 120. However, it should be appreciated that, in alternative embodiments, the vehicle controller(s) 126 may be configured to determine when to control the drive parameter(s) in the manner requested by the implement controller(s) 120 based on any other suitable parameter or combination of parameters.

As indicated above, the vehicle controller(s) 126 may be configured to control the operation of the drive parameters(s) to adjust the speed of the implement 10. Specifically, in several embodiments, the drive parameter(s) may correspond to a parameter of the engine 22, the transmission 24, and/or the braking actuator(s) 26. As shown in FIG. 4, in such embodiments, the vehicle controller(s) 126 may be communicatively coupled to the engine 22, the transmission 24, and/or the braking actuator(s) 26 to allow control signals (e.g., as indicated by dashed lines 140 in FIG. 4) to be transmitted from the vehicle controller(s) 126 to the engine 22, the transmission 24, and/or the braking actuator(s) 26. In this regard, the control signals 140 may be configured to instruct the engine 22 to vary its power output to increase or decrease the speed of the work vehicle 12. For example, when the monitored operational parameter falls outside of the predetermined range, the control signals 140 may instruct the engine 22 to decrease its power output (e.g., by decreasing the fuel flow to the engine 22) such that the speed at which the work vehicle 12 is moved across the field is decreased. Furthermore, the control signals 140 may be configured to instruct the transmission 24 to upshift or downshift to change the speed of the work vehicle 12. For example, when the monitored operational parameter falls outside of the predetermined range, the control signals 140 may instruct the transmission 24 to downshift such that the speed at which the work vehicle 12 is moved across the field is decreased. Additionally, the control signals 140 may be configured to instruct the braking actuator(s) 26 to activate in a manner such that the speed at which the work vehicle 12 is moved across the field is decreased. Such an adjustment in vehicle speed may improve the performance of the furrow closing assembly 62 such that the monitored operation parameter(s) is returned to the predetermined range(s). However, it should be appreciated that, in alternative embodiments, the vehicle controller(s) 126 may be configured to transmit control signals 140 to any other suitable component(s) of the work vehicle 12 and/or implement 10 such that the speed of the work vehicle 12 and/or implement 10 is adjusted.

Figure 5:
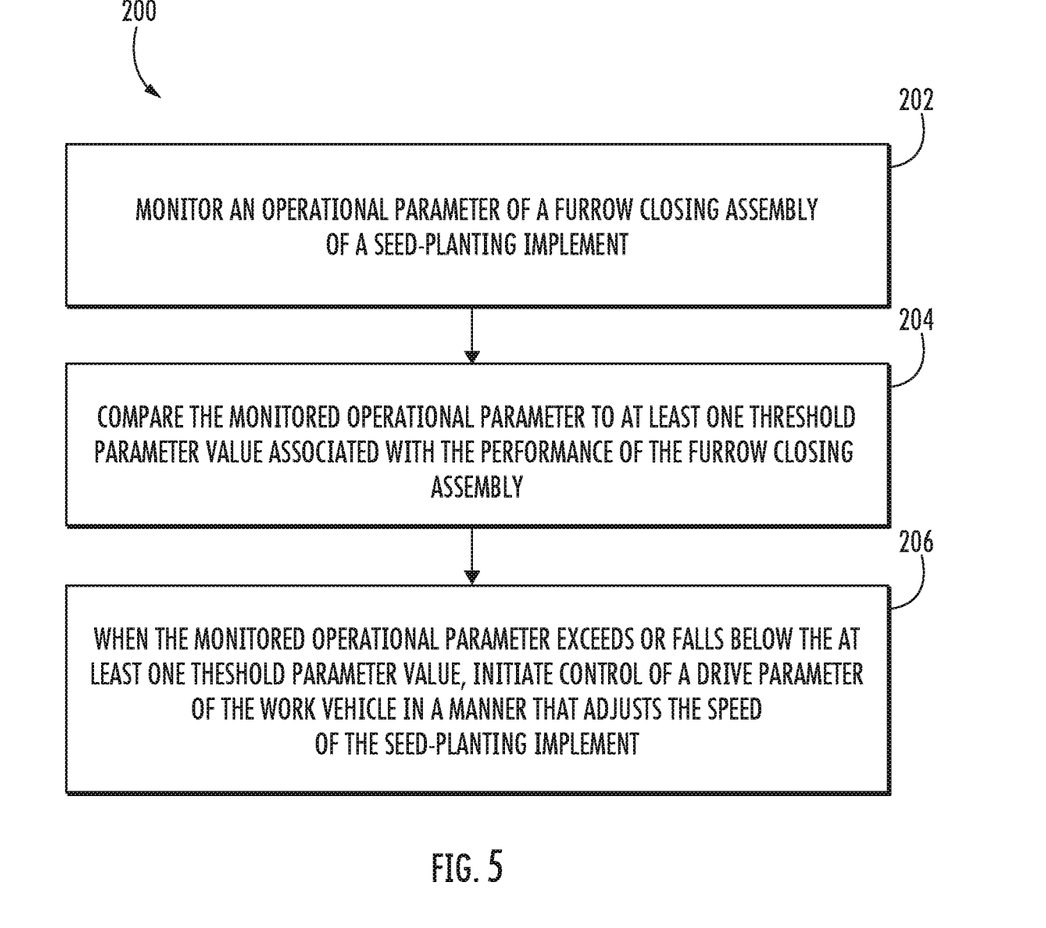
FIG. 5 illustrates a flow diagram of one embodiment of a method for controlling the speed of a seed-planting implement in accordance with aspects of the present subject matter.

Referring now to FIG. 5, a flow diagram of one embodiment of a method 200 for controlling the speed of a seed-planting implement is illustrated in accordance with aspects of the present subject matter. In general, the method 200 will be described herein with reference to the seed-planting implement 10, the work vehicle 12, and the system 100 described above with reference to FIGS. 1-4. However, it should be appreciated by those of ordinary skill in the art that the disclosed method 200 may generally be utilized to control the speed of an seed-planting implement being towed by a work vehicle for any implement having any suitable implement configuration, any work vehicle having any other suitable vehicle configuration, and/or in connection with any system having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include monitoring, with an implement-based computing device installed on the seed-planting implement, an operational parameter of a furrow closing assembly of a seed-planting implement. For instance, as described above, one or more implement controllers 120 may be communicatively coupled to one or more operational parameter sensors 116 configured to monitor a given operational parameter(s) of a furrow closing assembly 62 of the implement 10. As such, sensor data 132 transmitted from the operational parameter sensor(s) 116 may be received by the implement controller(s) 120 for monitoring the associated operational parameter(s).

Additionally, at (204), the method 200 may include comparing, with the implement-based computing device, the monitored operational parameter to at least one threshold parameter value associated with the performance of the furrow closing assembly. For instance, as described above, the implement controller(s) 120 may be configured to compare the monitored operational parameter(s) to at least one threshold parameter value associated with the performance of the furrow closing assembly 62, such as a maximum parameter threshold and/or a minimum parameter threshold. Assuming the monitored operational parameter(s) has exceeded the maximum operational parameter threshold or fallen below the minimum operational parameter threshold, the implement controller(s) 120 may determine that the speed of the implement 10 should be adjusted.

Moreover, as shown in FIG. 5, at (206), the method 200 may include, when the monitored operational parameter exceeds or falls below the least one threshold parameter value, initiating, with the implement-based computing device, control of a drive parameter of a work vehicle configured to tow the seed-planting implement in a manner that adjusts the speed of the seed-planting implement. For instance, as described above, the implement controller(s) 120 may be configured to transmit request signals 136 to the vehicle controller(s) 126 requesting the vehicle controller(s) 126 to control the operation of the engine 22, the transmission 24, and/or the braking actuator(s) 26 of the work vehicle 12 to adjust the speed of the implement 10.

It is to be understood that the steps of the method 200 are performed by the controllers 120, 126 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controllers 120, 126 described herein, such as the method 200, is implemented in software code or instructions which are tangibly stored on a tangible computer readable medium. The controllers 120, 126 load the software code or instructions via a direct interface with the computer readable medium or via a wired and/or wireless network. Upon loading and executing such software code or instructions by the controllers 120, 126, the controllers 120, 126 may perform any of the functionality of the controllers 120, 126 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for controlling the speed of a seed-planting implement, the system comprising:
   a furrow closing assembly including at least one ground engaging component configured to rotate relative to soil within a field as the seed-planting implement is moved across the field, the furrow closing assembly configured to close a furrow formed in the soil by the seed-planting implement;
   a sensor configured to capture data indicative of an operational parameter of the furrow closing assembly; and
   an implement-based controller supported on the seed-planting implement and being communicatively coupled to the sensor, the implement-based controller being configured to initiate control of a drive parameter of a work vehicle configured to tow the seed-planting implement based on sensor data received from the sensor in a manner that adjusts the speed of the seed-planting implement,
   wherein the sensor comprises at least one of a vision-blocked sensor or a radio detection and ranging (RADAR) sensor configured to capture data indicative of soil flow through the furrow closing assembly.

2. The system of claim 1, wherein the implement-based controller is further configured to monitor the detected operational parameter relative to at least one threshold parameter value associated with a performance of the furrow closing assembly and initiate control of the drive parameter in a manner that adjusts the speed of the seed-planting implement when the operational parameter exceeds or falls below the at least one threshold parameter value.

3. The system of claim 2, wherein the operational parameter corresponds to at least one of a penetration depth, a rotational speed, a load, or an acceleration associated with the at least one ground engaging component.

4. The system of claim 3, wherein the implement-based controller is configured to initiate control of the drive parameter of the work vehicle in a manner that reduces the speed of the seed-planting implement when at least one of the penetration depth falls below a predetermined penetration depth value, the rotational speed falls below a predetermined rotational speed value, the load exceeds a predetermined load value, or the acceleration exceeds a predetermined acceleration value.

5. The system of claim 1, wherein the implement-based controller is configured to initiate control of the drive parameter of the work vehicle to adjust the speed of the seed-planting implement based on the operational parameter and a field condition of a field across which the seed-planting implement is being towed.

6. The system of claim 5, wherein the implement-based controller is further configured to monitor the field condition based on at least one of stored field data or field data captured by a field sensor.

7. The system of claim 5, wherein the field condition corresponds to a field roughness, the implement-based controller configured to initiate control of the drive parameter of the work vehicle in a manner that adjusts the speed of the seed-planting implement when it is determined that the monitored field roughness has exceeded a predetermined field roughness threshold.

8. The system of claim 1, wherein the implement-based controller is configured to receive the sensor data from the sensor and transmit signals to a vehicle-based controller of the work vehicle requesting that the vehicle-based controller adjust the drive parameter.

9. The system of claim 8, wherein the vehicle-based controller is configured to adjust the drive parameter of the work vehicle based on the signals received from the implement-based controller.

10. The system of claim 1, wherein the drive parameter corresponds to a parameter of at least one of an engine, a transmission, or a braking actuator of the work vehicle.

11. A method for controlling the speed of a seed-planting implement, the method comprising:
   monitoring, with an implement-based computing device installed on the seed-planting implement, an operational parameter of a furrow closing assembly of the seed-planting implement;
   comparing, with the implement-based computing device, the monitored operational parameter to at least one threshold parameter value associated with a performance of the furrow closing assembly;

when the monitored operational parameter exceeds or falls below the least one threshold parameter value, initiating, with the implement-based computing device, control of a drive parameter of a work vehicle configured to tow the seed-planting implement in a manner that adjusts the speed of the seed-planting implement; and receiving, with the implement-based computing device, data indicative of soil flow through the furrow closing assembly from a sensor.

12. The method of claim 11, wherein the operational parameter corresponds to at least one of a penetration depth, a rotational speed, a load, or an acceleration associated with the at least one ground engaging component of the furrow closing assembly, the at least one ground engaging component configured to rotate relative to soil within a field as the agricultural implement is moved across the field.

13. The method of claim 12, further comprising:
initiating, with the implement-based computing device, control of the drive parameter of the work vehicle in a manner that reduces the speed of the seed-planting implement when at least one of the penetration depth falls below a predetermined penetration depth value, the rotational speed falls below a predetermined rotational speed value, the load exceeds a predetermined load value, or the acceleration exceeds a predetermined acceleration value.

14. The method of claim 11, further comprising:
initiating, with the implement-based computing device, control of the drive parameter of the work vehicle to adjust the speed of the seed planting implement based on the operational parameter and a field condition of a field across which the seed-planting implement is being towed.

15. The method of claim 14, further comprising:
monitoring, with the implement-based computing device, the field condition based on at least one of stored field data or field data received from a field sensor.

16. The method of claim 14, wherein the field condition corresponds to a field roughness, the method further comprising:
initiating, with the implement-based computing device, control of the drive parameter of the work vehicle in a manner that adjusts the speed of the seed-planting implement when it is determined that the monitored field roughness has exceeded a predetermined field roughness threshold.

17. The method of claim 11, further comprising:
receiving, with the implement-based computing device, the sensor data from the sensor; and
transmitting, with the implement-based computing device, signals to a vehicle-based controller of the work vehicle requesting that the vehicle-based controller adjust the drive parameter.

18. The method of claim 11, wherein the drive parameter corresponds to a parameter of at least one of an engine, a transmission, or a braking actuator of the work vehicle.

* * * * *